Aug. 11, 1964
H. E. LUSTIG ETAL
3,144,631
RADIATION MAPPING SYSTEM
Filed Jan. 9, 1962
4 Sheets-Sheet 1
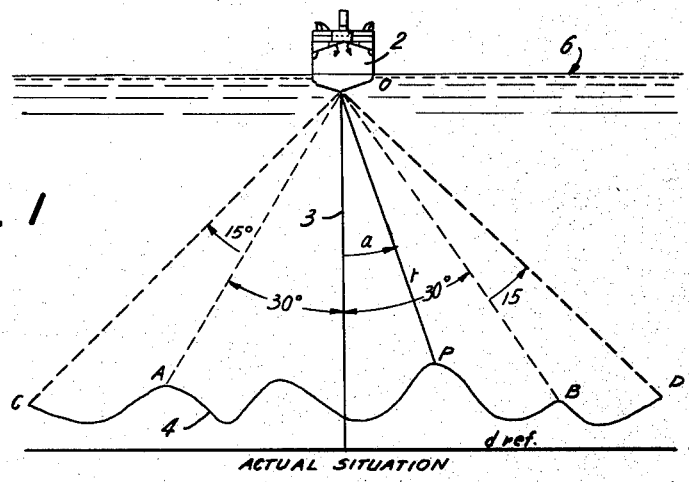
FIG. 1
ACTUAL SITUATION
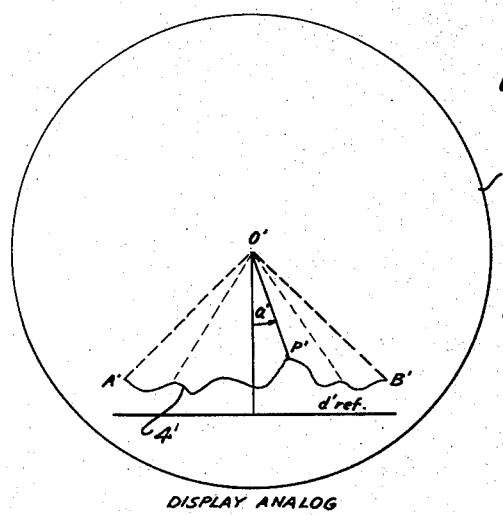
FIG. 2
DISPLAY ANALOG
FIG. 7
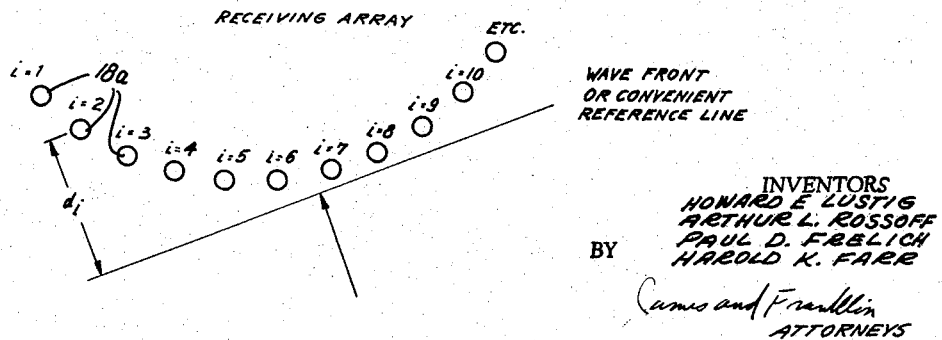
INVENTORS
HOWARD E. LUSTIG
ARTHUR L. ROSSOFF
PAUL D. FRELICH
BY HAROLD K. FARR
ATTORNEYS

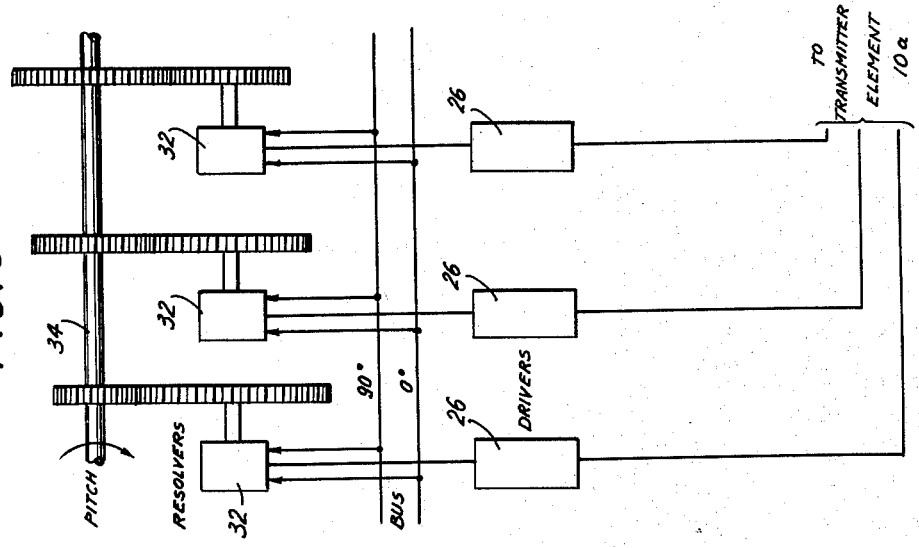
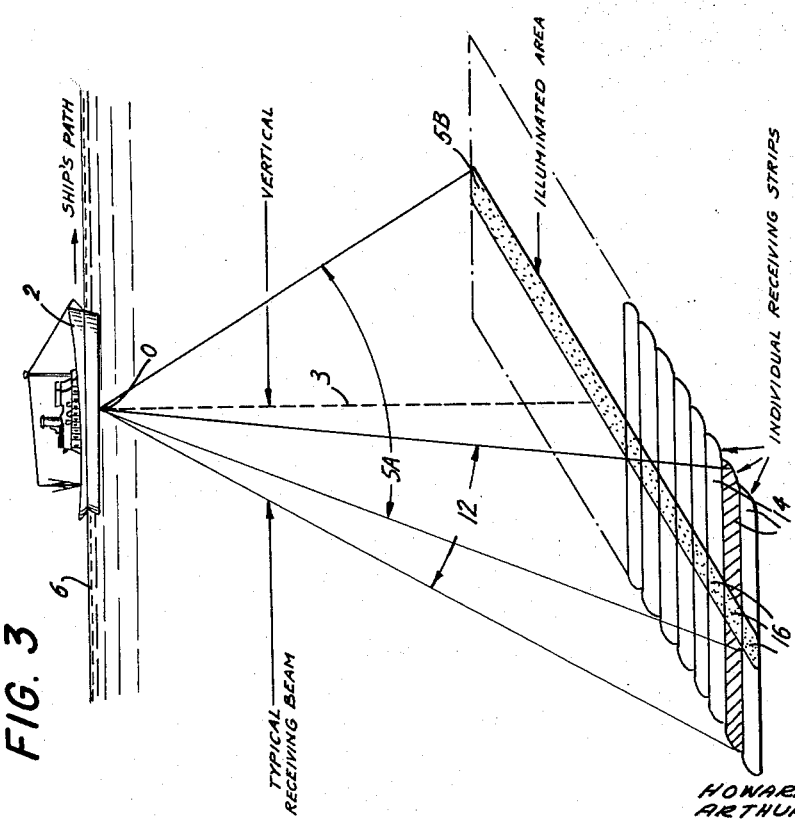

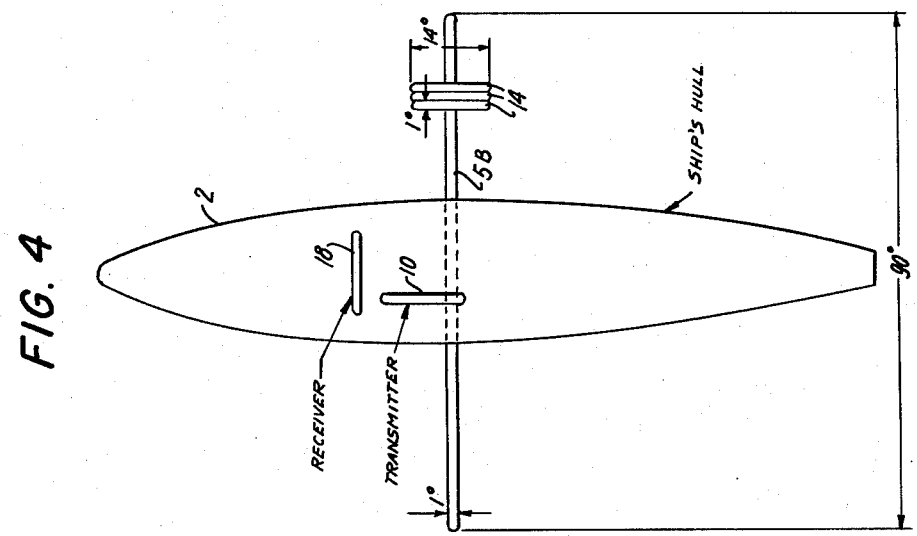
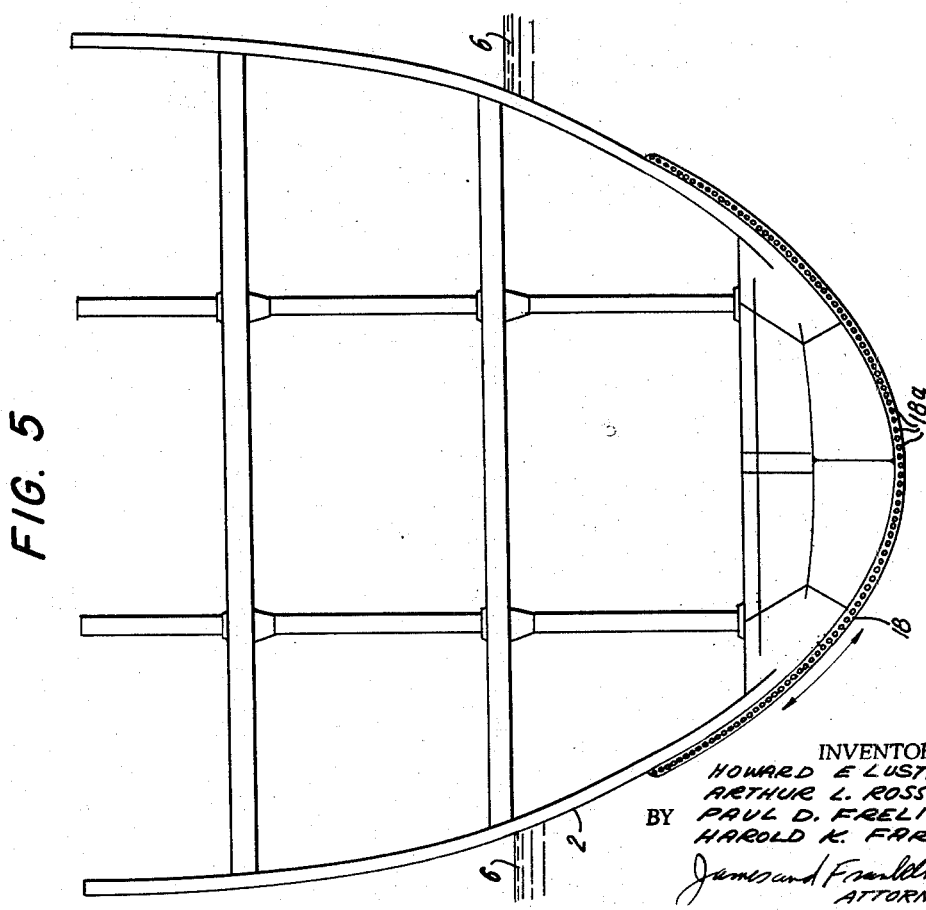

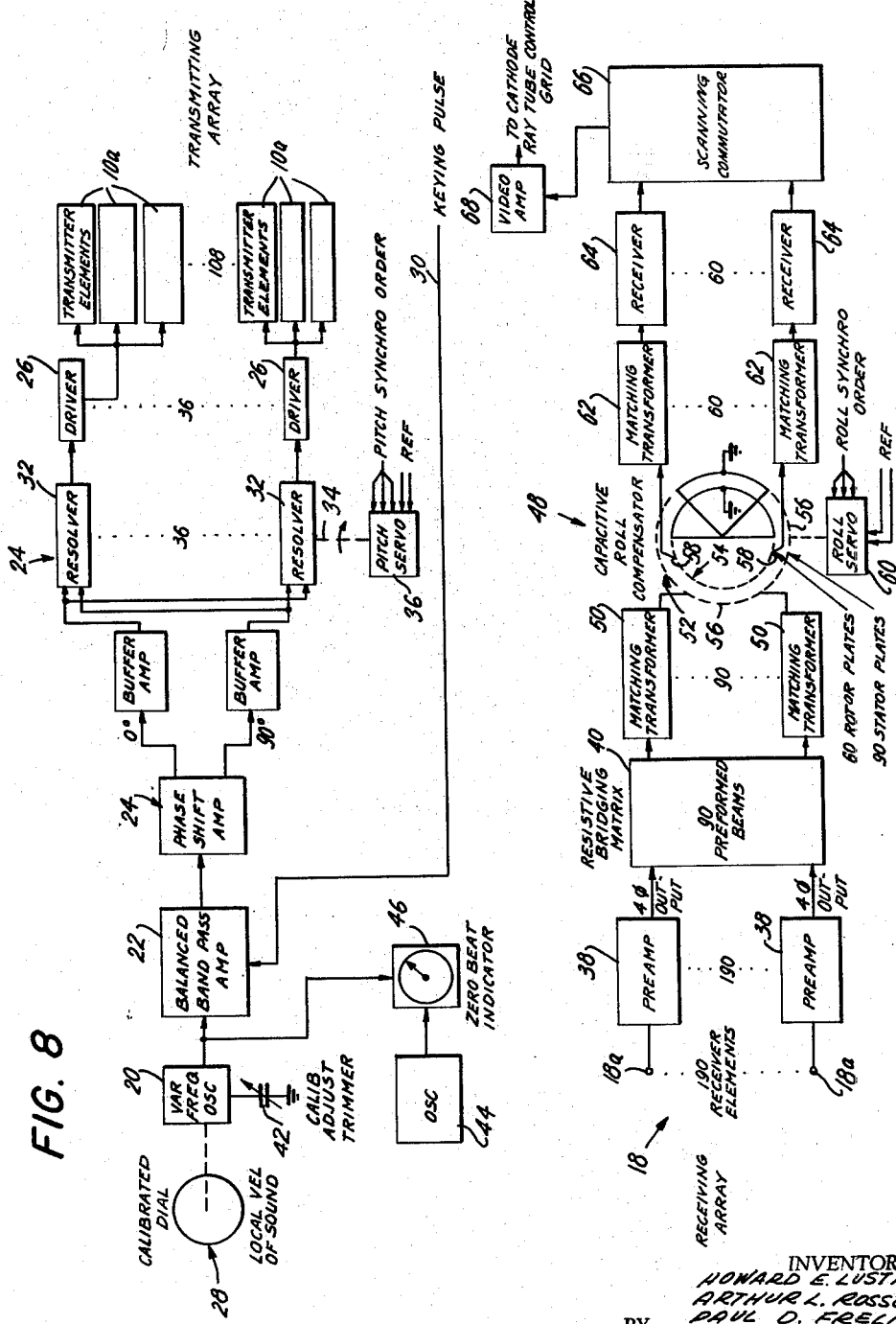

3,144,631
RADIATION MAPPING SYSTEM
Howard E. Lustig, Flushing, and Arthur L. Rossoff, Huntington Station, N.Y., and Paul D. Frelich, Wellesley, and Harold K. Farr, Westwood, Mass., assignors to General Instrument Corporation, Newark, N.J., a corporation of New Jersey
Filed Jan. 9, 1962, Ser. No. 165,173
22 Claims. (Cl. 340—3)

The present invention relates to a system for mapping an area from a mapping station moving thereover, the mapping station emitting radiations which are reflected from the area to be mapped and which are then detected by appropriate equipment carried by the mapping station. The invention is here specifically disclosed in conjunction with a shipborne system for mapping the contour of the sea bottom by means of sonar radiations, but the invention is not specifically limited thereto. Purely by way of example, it is equally applicable in many respects to an airborne radar ranging method for mapping the terrain over which the aircraft flies.

Mapping of the ocean bottom through the use of sonar is not a new concept. However, the systems which have heretofore been employed for that purpose have inherently limited the use of such a method, either because of lack of accuracy and definition, because of extreme limitations on the speed at which the mapping vessel could move, or both. In addition, the nature of such systems has made it impractical to provide accurate compensation for such aberrational movements of the mapping station as changes in speed, changes in depth (in the case of submarines), roll, pitch and the like.

One proposal which has been made in the past to solve at least some of these problems is to utilize a single relatively narrow sonar beam emanating from the mapping station, that beam scanning from side to side over a given strip area of the sea bottom and being employed both for transmission of radiations and for reception of reflections from the sea bottom. Because of the relatively slow speed with which sound moves through water, this use of a single beam for transmission and reception of the appropriate radiations necessitates a relatively slow scan, the necessary scanning time increasing as the depth of the sea increases, and thus places prohibitive restrictions on the speed at which the vessel can move in mapping an area of the sea bottom.

By way of contrast the system of the present invention utilizes separate beams for transmission and reception respectively, thus dividing the burden of directivity between the two beams and hence greatly simplifying design. Moreover, the construction and arrangement of these beams are such as to permit the vessel to move at reasonable cruising speed without any loss in map coverage. In addition, the arrangement of the individual transmitting and receiving beams in the system of the present invention permits the ready compensation of the system for roll and pitch of the vessel.

In the proposed system the transmitted beam is in the shape of a thin fan lying in a downwardly extending plane preferably perpendicular to the heading of the ship, the angular width of that fan beam being sufficiently greater than the area of the bottom which is to be mapped so as to take into account roll of the ship. Thus, there is no need to compensate the transmitted beam for ship roll. Means are provided, however, for compensating the transmitted beam for ship pitch, thereby ensuring that the transmitted beam is always directed in its desired direction, generally vertically oriented. This fan shaped beam, which may be 90° wide and 1° thick, illuminates a long narrow area of the ocean floor lying perpendicular to the ship's heading, and as the ship progresses, successively narrow areas of the ocean floor are illuminated thereby, thus producing a substantially continuous mapping coverage of a strip of the sea bottom.

Reflected radiations are received by the mapping station in a plurality of closely spaced narrow downwardly extending fan-shaped beams the planes of which are preferably oriented substantially perpendicular to the transmitting beam, and hence substantially parallel to the fore-and-aft direction of the ship. Thus, each of the individual receiving beams will cover a thin narrow area of the ocean floor, the areas corresponding to adjacent receiving beams lying side by side on the ocean bottom and collectively being intersected by the transmitting beam. Since the receiving beams each cover areas which are longer in the fore-and-aft direction of the vessel than the thickness of the transmitting beam, forward movement of the ship does not interfere with reception, and in addition there is no need to compensate the receiving beams for pitch of the ship. Roll of the ship will, however, move the areas sighted by each of the receiving beams laterally over the sea bottom, so that roll compensation is desirable. In the instant system this is accomplished by utilizing receiving beams which, in number and placement, cover a lateral distance on the ocean floor greater than that to be mapped. As the ship rolls only those beams are selected which cover the specific area of the ocean floor which is to be mapped; the other beams are unused insofar as the instantaneous production of the signal representing the contour of the ocean floor is concerned.

As here specifically disclosed, the transmitting beam emanates from a transmitter comprising a plurality of individual transmitting elements arranged longitudinally on the ship's hull, and the reflected radiation receiver comprises a plurality of individual receiver elements arranged laterally on the ship's hull. Pitch control for the transmitting means is accomplished by controlling the phasing of the radiations emanating from each of the individual projector elements. As has been mentioned, roll compensation for the receiving means is accomplished by selecting those of the individual receiver elements which are associated with the appropriate receiving beams corresponding to the area to be mapped. Since the ship's hull is usually curved, the laterally arranged individual receiver elements, if they conform to the hull, would not be in a common plane. In order to compensate for such departure from a planar configuration, when it exists, the individual signals produced by the individual receiver elements have their relative phases adjusted so that, insofar as the display means is concerned, they are all at the same effective distance from a reference plane perpendicular to the direction of the desired receiving beam.

Through the use of the present system an accurate representation of an appreciably wide area of the sea bottom can be produced and complete coverage of the sea bottom over that longitudinally projected area is possible with the ship moving at cruising speed or even at high speed, thus permitting extensive areas of the sea bottom to be continuously mapped in an accurate and effective manner.

To the accomplishment of the above, and to such other objects as may hereinafter appear, the present invention relates to a system for mapping through the use of transmitted and reflected radiation as defined in the appended claims, and as described in this specification, taken together with the accompanying drawings in which:

FIG. 1 is a schematic view illustrating the scanning of a single narrow laterally oriented strip of the sea bottom;

FIG. 2 is an idealized representation of one way in which the profile of the scanned strip of the sea bottom could be reproduced on the face of a cathode ray tube;

FIG. 3 is a diagrammatic perspective view of the orientation of the respective transmitting and receiving beams;

FIG. 4 is a diagrammatic plan view illustrating a typical location of the transmitting and receiving means on the ship's hull, and also showing the location relative thereto of the areas on the sea bottom covered by the transmitted beam and a selected few of the receiving beams;

FIG. 5 is a diagrammatic cross sectional view showing one location of the receiving means on the ship's hull;

FIG. 6 is a schematic view indicating the manner in which the projecting beam may be stabilized for pitch;

FIG. 7 is a schematic view indicating the problem involved in the reception of reflected radiations by individual receiving elements located at different vertical heights; and FIG. 8 is a block diagram of the electronic systems involved in transmission and reception of the radiation.

*General Description*

This invention will be here specifically disclosed as embodied in a mapping system carried by a surface vessel 2, designed to map the bottom of the sea, generally represented at 4, and using sonar radiations to accomplish that result. It will be understood that the vessel 2 could be a submarine (in which case computation of the depth of the floor 4 below sea level, generally designated 6, would have to take into account the depth of the submarine at the time that the mapping operation is performed), and that in its broader aspects, a comparable type of mapping operation could be carried out utilizing other types of radiated energy, for the mapping of other types of areas, and with other types of movable mapping stations (e.g. airborne radar mapping of the exposed surface of the earth).

As schematically represented in FIGS. 1 and 2, a display representation of the profile of a narrow area of the sea bed can be produced on the screen 8 of a cathode ray tube or the like. Taking the situation shown in FIG. 1, where the ship 2 is shown at position 0 and is assumed to be moving out of the plane of the paper, the ship 0 scans the sea bottom 4 by means of transmitted radiations (usually sonar radiations for undersea work), and detects radiations reflected therefrom, identifying those radiations in terms of range $r$ (time delay between transmission and reception) and lateral location (angular relationship $a$ of the reflected radiation relative to a fixed standard, usually the vertical). Thus radiation reflected from the point P in FIG. 1 will be detected by the sonar equipment on the ship 2 and the location of the point P can be accurately determined by trigonometric computations. An analog of the actual situation as represented in FIG. 1 can be created in known manner on the cathode ray tube screen 8, as indicated in FIG. 2, thus producing on the face of that screen a visible trace 4' which will correspond to the profile of the area 4 of the sea bottom then being scanned.

It is assumed that the area of the sea bottom 4 to be mapped extends laterally between points A and B, subtending an angle of 60° at point 0. If only that 60° angle is scanned, then roll of the ship will cause the points A and B to move laterally over the sea bottom, thus mapping an area different from that which should be mapped. Accordingly, the profile actually illuminated by the transmitted radiation is shown as extending between points C and D, subtending an angle of 90° at point 0. In this manner the 60° portion centered on the vertical 3 is always illuminated as long as the ship's roll does not exceed 15° in either direction.

In accordance with the present invention as here specifically disclosed, and as shown particularly in FIGS. 3 and 4, the sonar energy emanating from the ship 2 is transmitted in the form of a thin fan beam 5A lying in a substantially vertical plane perpendicular to the heading of the ship. This beam, which is 90° wide (for reasons indicated above and illustrated in FIG. 1) and which may be approximately 1° thick, illuminates a long narrow area of the ocean floor, as indicated at 5B in FIGS. 3 and 4, this area 5B extending perpendicular to the ship's heading. As the ship progresses, this illuminated strip 5B sweeps out into an area determined by the speed and direction of movement of the ship 2. To form the transmitting beam, the transmitter 10 may be located on the ship's hull at a position such as is illustrated in FIG. 4, and may be composed of a plurality of individual transmitter elements 10a arranged longitudinally on the hull as indicated.

For receiving transmitted radiations which are reflected from the sea bottom or other terrain being mapped, a plurality of individual fan-shaped receiving beams, generally designated 12, are employed. The planes of these beams are oriented substantially perpendicular to the transmitted beam 5A, that is to say, they are narrow (approximately 1°) widthwise of the ship 2 and are long (extending 7° to either side of the nominal vertical axis 3 of the ship 2) in the fore-and-aft direction of the ship 2. The beams 12 sight adjacent areas 14 on the sea bottom, the areas 14 intersecting the area 5B at 16.

If, as indicated in FIG. 1, a 60° width in scanning may be desired, sixty receiving beams 12, each of 1° width, would then be required. However, if this were all that were done, roll of the ship 2 would laterally translate the beams 12, so that not all of them would intersect with the strip 5B at the proper points 16. In order to eliminate this disadvantage, the beams 12 should collectively subtend at point 0 a lateral angle greater than 60°, such as 90° (thus involving the use of ninety receiving beams 12 each 1° wide). This will permit a roll of the ship 15° in either direction, as indicated in FIG. 1, while at the same time providing the desired number (e.g. 60) of individual receiving beams 12 to intersect the illuminated area 5B.

Means 48 are provided to select those sixty receiving beams 12 which intersect the area 5B between the points A and B at any given moment, and to use the energy derived from those selected beams 12 to produce the display analog 4'.

The receiver array, generally designated 18, may be located on the ship 2 in a manner indicated in FIG. 4, arranged laterally relative to the length of the ship.

Because the length of the beams 12 (measured in the fore-and-aft direction of the ship 2) is greater than the corresponding dimension of the transmitted beam 5A, pitch of the ship 2, within limits, will not have any adverse effect upon the operation of the system insofar as reception is concerned, since, as may clearly be seen from FIG. 3, considerable longitudinal movement of the areas 14 is permissible without destroying their intersection with the area 5B.

The manner in which the analog display 4' is used may be varied widely. A series of such display analogs may be photographed or otherwise reproduced, and appropriate maps synthesized therefrom. Alternatively, and as is preferred, the display analogs 4' may be used to produce a contour map representation directly, in a manner such as is disclosed in the copending application of Howard E. Lustig and Arthur L. Rossoff, Serial Number 165,064, entitled, "Contour Mapping System," filed on January 14, 1962, now abandoned, and assigned to the assignee of this invention. However, the precise manner in which the display analog 4' is used forms no part of the present invention.

*Transmitter*

The physically fixed transmitter 10 is formed of a plurality of individual transmitting elements 10a which may be placed on the bottom of the hull 2 and aligned parallel to the longitudinal axis of the ship. One hundred and eight individual elements 10a may be employed, each having a radiating area 2" wide and 2¼" long in the direction of the axis of the array. The total length of the array may be 24 feet. For an operative frequency of 12 kc. this will produce a fan-shaped transmitting beam 4A that subtends an angle (measured at the −3 db points) of approximately 1° in the fore-and-aft direction and 90° in a direction perpendicular to the ship's heading. Each of the transmitting units 10a may be actuated by circuitry (see FIG. 8) including an oscillator 20, amplifier 22, phasing circuits 24 and drivers 26.

The oscillator 20 is of the variable frequency type, and may be adjusted, as indicated at 28, to modify the frequency of the transmitted indications. It is desirable that this be done to compensate for variations in the speed of propagation of those radiations through the water as the temperature of the water varies, thereby maintaining the wavelength of the radiations in the water constant.

A keying pulse 30 is used to initiate pulse transmission from the elements 10a at the proper repetition frequency and power level.

The repetition frequency, and its relationship to the depth of the sea and the forward speed of the ship 2, may be appreciated from the following analysis:

For any desired maximum depth, the interval between pulses will be determined by the maximum slant range involved, which occurs for the beam looking farthest to the side. Here, $$R_{max} = D_{max}/\cos \psi_{max}$$

where $D_{max}$ is the specified maximum depth to be mapped (reference depth)
$\psi_{max}$ is the maximum side looking angle to be used, and
$R_{max}$ is the resulting maximum slant range.

The resulting ping interval, which sets the pulse repetition rate, is:

$$T_p = 2D_{max}/c \cos \psi_{max} = 2R_{max}/c$$

where $c$ is the velocity of sound.

This time, within which all possible returns will come back from the bottom, affects the permissible forward speed of the ship. Consider the distance along the bottom subtended by the transmitted fan beam in the fore-and-aft direction. This distance is $D\theta/\cos \psi$, where D is the actual depth, $\theta$ is the fore-and-aft beam width (in radians), and $\psi$ is the side looking angle. Note that $D/\cos \psi = R$ is the slant range to the bottom. There exists some point at the bottom for which this slant range is a minimum.

The time required for the ship to travel the forward distance subtended by the beam at this minimum slant range is given by $$t = \theta R_{min}/v$$

where $v$ is the speed of the ship expressed in the same linear dimensions as $R_{min}$. If the speed of the ship is such that $t$ is equal to $T_p$, then 100% coverage of the bottom will result: that is, successive pings will illuminate areas that are adjacent. If the speed is such that $t$ is greater than or less than $T_p$, then overlapping or else less than 100% coverage of the bottom respectively, will result.

Therefore, at least 100% coverage will be guaranteed if the following conditions hold:

$$\theta R_{min}/v \geq 2D_{max}/c \cos \psi_{max}$$

By rearrangement, the following limitations on ship's speed apply for 100% (or greater coverage).

$$v \leq c\theta R_{min} \cos \psi_{max}/2D_{max}$$

For $\theta = 1° = .01745$ radian, $\psi_{max} = 30°$, and $c = 2922$ knots, $$v \leq 22.1 (R_{min}/D_{max}) \text{ knots}$$

This can be interpreted as follows: suppose the system repetition rate is set to cover a maximum depth of 4000 fathoms, and further, that the bottom is flat and is 3000 fathoms down. Ship's speeds up to $$22.1 \times 3000/4000 = 16.5 \text{ knots}$$

can then be used for full coverage of the bottom area. If the bottom were 1500 fathoms down, the ship could proceed either at up to 8.25 knots, or change the repetition rate to correspond to 2000 fathom maximum depth and then proceed once more at 16.5 knots. In the limiting case, where the desired maximum depth coincides with the actual depth, a speed of 22.1 knots still yields 100% coverage. In other words, with prior knowledge of the bottom, a pulse repetition rate can be selected which will allow the vessel to cruise at normal and even high speeds.

The transmitted beam 5A is stabilized electronically so as to remain in the true vertical plane regardless of pitching of the ship. The beam steering necessary for stabilization is accomplished by the phasing scheme indicated in FIGS. 6 and 8. As here specifically disclosed, the 108 elements 10a in the transmitter array are divided into 36 groups of three elements each. Each group is powered by a separate driver 26. The actual phasing is accomplished with resolvers 32 operating at low power levels. This method provides precise and smooth control of phase, and eliminates the problems associated with complex compensator plates and delay lines.

If $\theta$ is the angle of pitch, then the beam should be steered by an amount $\theta$, and transmitter group number $n$ (where $n$ is counted from the center of the array 10) should introduce a phase shift $$\phi_n = (2\pi na/\lambda) \sin \theta$$

where $a$ is the spacing between groups of elements (which may in practice amount to 8″) and $\lambda$ is the wave length of the radiations in water. The pitch in sea-state 3 or 4 is about ±3.5°. Hence, within the practical range of $\theta$ values, we can replace $\sin \theta$ by $\theta$ with an error of less than 8 seconds of arc. The angle of rotation of resolver 32 for transmitter group $n$ is then $$\phi_n = (2\pi na/\lambda) \theta = n\phi_1$$

Hence, the rotation angle of the output shaft 34 of a pitch servo 36 can be represented as $\phi_1 = (2\pi a/\lambda) \theta$, which is just proportional to the pitch angle $\theta$, therefore the pitch servo 36 can drive the first resolver 32 directly and successive resolvers 32 through gear ratios having simple integral values 2, 3, . . . 18 (corresponding to $n$) (see FIG. 6). As a practical matter it is preferable to use the higher speed shaft, $\phi_{18}$, rather than $\phi_1$, as the input pitch signal and then to gear down to all the other channels. The number 18 is one-half the total number of channels. The remaining 18 channels (numbered 0, −1, −2, . . . −17) can be driven from the same shafts by reversing the leads on one of the quadrature component inputs to the resolvers. The number zero channel is electrically energized without phasing.

*Receiver*

The receiver array 18 which is used to sense the return echo determines the directivity of the sonar system in the athwartship direction. It is capable of defining a thin fan beam 12 which is about 1° wide in this direction and 14° wide in the fore-and-aft direction. Phasing networks simultaneously generate 90 such (pre-formed) beams, spaced at intervals of 1° along the length of the strip 5B illuminated by each transmitted pulse.

The location of the array is determined by the requirement, on the one hand, that it be near enough to the center of the ship to permit the use of a large array and, on the other hand, that it be far enough forward to avoid excessive engine noise. FIG. 5 shows a suggested installation. It consists of a narrow belt of individual receiving elements 18a disposed across the underside of the hull. The belt is 18 inches wide in the fore-and-aft direction, and covers a projected length of 23 feet. The two ends of the belt are terminated far enough down the hull to be well below water for a roll of 15°. Also, as a result, there exists no possibility of damaging the array in a normal docking operation. The actual hydrophone elements 18a will be about one inch in diameter. (Their size, as indicated in the illustration, is necessarily exaggerated.) The array is "conformal" in the sense that the elements are placed as close as possible to the hull at all points, rather than along some simpler curve. The spacing between elements has tentatively been chosen as 1.8″ or 0.36 λ. A total of 190 individual hydrophones 18a may be used.

In order to generate a preformed beam, i.e., to set up a particular receiving channel corresponding to one of the 90 beam directions, it is possible to introduce an appropriate time delay in the signal from each hydrophone and then to combine all signals in a single receiver. This could be done, for example, by connecting the various hydrophones 18a into selected taps along a single delay line, the output of which goes to the receiver 64. In such an arrangement, the delays are conventionally chosen so that for a particular wave front arriving in the selected direction, the signals from all hydrophones arrive at the receiver simultaneously. In the disclosed installation, however, the array is so large that the artifical delays required by this method would, in some cases, amount to as much as 17 complete cycles (corresponding to 17 wave lengths). With such long delays, a rather small change in sound velocity can produce a significant distortion in the directivity pattern. A temperature variation from 28° to 85° F. (roughly the difference between arctic and tropical waters) produces a radiation velocity change from 4710 to 5060 ft./sec., or a change of about 7%. For a 17 cycle delay, a change of ±3.5% from the nominal value would cause an error of 0.6 cycles, or a phase shift of 214 degrees.

To eliminate pattern distortion due to changes in sound velocity, the operating frequency (as has been set forth above in the preceding section) will be adjusted so that the wavelength in the water is maintained at its nominal value. With conventional delay lines, this would introduce comparable errors in the artificial delays. These errors can be largely avoided, however, if the artificial delays are limited to, at most, one full cycle, or if the signals are "phased" rather than delayed. According to this scheme, which is preferred, the signals are delayed sufficiently to bring them all into phase, but not to insure coincidence of the entire wave train. A pulse of 7 milliseconds duration at 12 kc. contains 84 cycles. At the hydrophones 18a, delay from the earliest to the last arrival of a leading edge of a pulse is about 17 cycles. Phasing, as opposed to delaying for complete coincidence, therefore causes some smearing of the head and tail of the total pulse voltage seen by the receiver, and a consequent slight loss in signal energy. This loss is easily estimated by considering the simpler case of a flat array steered out to an angle requiring a total delay of 17 cycles from one end of the array to the other. For an ideal rectangular transmitted pulse, the voltage pulse at the receiver is trapezoidal and the received energy is down by a factor of $1-n/3N$ from the ideal value, where $n/N$ is the ratio of the delay to the original pulse length. When this has the value 17/84, the relative energy is 0.933, down 0.3 db from the ideal value for true delay lines. Because the present array is curved rather than flat, the signal loss is actually somewhat less than this.

The maximum aperture available on the present array is 23 ft. when looking straight down. At 12 kc., a beam which is 1° wide requires an aperture of 21 ft. For beams steered in various directions the actual array must be large enough so that the length projected on the plane of the wave front is equal to this value. This will ordinarily mean that only the central portion of the full array is required for those beams close to the vertical while the maximum number of elements are required for beams that are directed furthest to the side of the ship.

The output of each receiver element 18a will be amplified by a preamplifier 38 before application to the beam forming networks. This is necessary because bridging losses in the beam forming networks and losses in the roll compensator must be made up; and also because, in many cases, a single hydrophone signal contributes to the formation of each one of the 90 preformed beams. The preamplifier 38 supplies the necessary signal power for these multiple loads without causing signal degradation.

The preamplifier 38 may consist of an input transformer, a resistance coupled transistor stage, and, for maximum D.C. efficiency, a transformer-coupled stage with a feedback winding to the first stage emitter. A wide band quadrature phase shift network and two separate transformer-coupled output stages with self feedback to each emitter complete the circuit. If the input transformer turns ratio is 10, the feedback ratio of the intermediate transformer is 42, and the feedback ratio of the output transformer is 2.4, then the preamplifier voltage gain will be approximately 1000 or 60 db. The output winding of each output transformer will be center tapped, making available the following quadrature voltages:

$$+E_{sig}, -E_{sig}, +jE_{sig}, \text{ and } -jE_{sig}$$

Any desired relative phase shift of the signal can be achieved by resistive bridging of the available quadrature signals.

A set of voltages that is a replica of the open circuit voltages of the hydrophones in the receiving array is available at the preamplifier outputs. The wave front of a plane wave signal arriving from some particular direction arrives at each hydrophone 18a (see FIG. 7) at different times. A maximum response to this sgnal can always be realized regardless of its signal bandwidth by compensating each preamplifier output with an appropriate time delay and then adding the corrected signals in a linear fashion. For the case of a narrow bandwidth signal a correction for phase only need be made before adding. Once these corrections have been computed for any particular angle of arrival and a correcting network has been "wired in," then a preformed beam for that particular direction will have been generated. Corrections and correcting networks for many angles can be computed using the same hydrophones 18a and preamplifiers 38, and thus a whole set of preformed beams can be built up.

Since the system here disclosed is of the narrow band type (i.e., the required signal bandwidth is a small percentage of the carrier frequency), beams 12 may be formed by correcting the contribution of each hydrophone 18a for phase and then summing the contributions of many hydrophones 18a in a linear fashion. The preamplifiers 38 are arranged to have four outputs having the relative phases of 0°, 90°, 180°, and 270°. From these available phases, any desired signal phase shift can be generated by connecting two bridging resistors across any adjacent pair of available phases. For example, if 123° of phase shift is required, then two series resistors are bridged across the 90° bus and the 180° bus. The resistor connected to the 90° bus should be made equal to $R \sec 33°$, and the other should be $R \csc 33°$, where R is the nominal impedance level. This pair of resistors, connected to the proper buses, could also provide phase shifts of 33°, 213°, and 303°, or if interchanged, of 57°, 147°, 237°, and 327°. The matrix of these resistors is designated 40.

Next consider the formation of a beam perpendicular to a plane wave arriving at the conformal array 18 from some particular direction corresponding to the orientation of a given receiving beam 12 (see FIG. 7). A delay distance $d_i$, measured from some reference, can be determined for each element 18a in the array. Some convenient line in the plane of the array parallel to the incoming wave front can be used as a reference. Thus knowing $d_i$, the relative phase delay in the water, $\phi_i$ can be determined. It will be a function of frequency and sound velocity and is given by $$\phi_i = d_i \times f \times 360/c \text{ (degrees)}$$

where $i$ is the element number, $d_i$ is measured in feet, $c$ in feet per second, and $f$ in cycles per second.

Now let us define the phase shift made possible by the bridging resistors 40 at the output of the four phase preamplifier as $\theta_i$.

For each element in the array, $\theta_i$ is adjusted so that $\phi_i$ plus $\theta_i$ is equal to a whole number of cycles. That is, $$\phi_i + \theta_i = n360°$$

where $n$ is an integer. All the bridging resistors 40 are tied to a common summation point, at which a beam becomes available, pointing in the particular direction for which the various $\phi_i$ were computed. Other bridging resistor sets can be computed for other angles of arrival and connected to the multiphase preamplifier outputs.

From the equation given for $\phi_i$, it can be seen that the phase shift will vary when the local sound velocity varies. This could amount to ±3.5% from the polar regions to the equatorial regions and, if left uncompensated, could seriously reduce and broaden the main lobe and bring up the side lobes. Fortunately, a corresponding percentage change in the operating frequency compensates for the velocity change. Therefore, the outgoing frequency will be controlled by a calibrated variable frequency oscillator 20. The frequency control dial indicator 28 will be calibrated directly in local sound velocity. A recessed trimmer 42, a 12 kc. crystal oscillator 44, and a zero beat indicator 46 will be used to check calibration.

Ninety preformed beams 12 will be formed for a total look of 45° to either side. A uniform beam spacing of 1° from beam center to beam center will be employed. The first beam 12 that looks to the left will be depressed 89.5° relative to the deck plane as will be the first beam 12 that looks to the right. The second beam 12, either right or left, will be depressed 88.5°, the third 87.5° etc., until the 45th beam 12, which will be depressed 45.5°

Signals from all 90 beams 12 are applied to the roll compensator 48 via matching transformers 50. The purpose of the roll compensator 48 is to select from the 90 available preformed beams 12, those 60 beams 12 which, at any instant, are closest to the vertical.

The roll compensator 48 may comprise a capacitor switch having a stator 52 and a rotor 54. The stator may comprise an insulating flat plate about 10 inches in diameter with 90 individual printed circuit sectors 56, each 3 degrees wide, distributed evenly over an arc of 270 degrees. The rotor 54 will be similar, but will have 60 printed sectors 58, each 3 degrees wide, covering a total arc of 180 degrees. The remaining 90 degrees of the stator and 180 degrees of the rotor surface will be at ground potential. The rotor may be mounted parallel to the stator at a separation of 0.01 inch.

The angular scale factor of the compensator has been multiplied by 3 to utilize the available capacitance more fully. A given roll angle is thus compensated by turning the rotor 54 just 3 times as much. Rolls of ±15 degrees will be compensated for in the present design by turning the compensator rotor 54 ±45 degrees. Since the compensator rotor 54 never makes a complete revolution, slip rings will not be necessary. Sixty flexible leads are used to bring the rotor signals out. The rotor 54 is positioned by a servo mechanism 60 driven by synchro signals from the ship's gyro system representing the ship's roll. The capacitive commutator 48 is capable of connecting an output proportionally to two adjacent beam inputs. This makes it possible to obtain continuous and smooth roll compensation.

The beam signals applied to each of the rotor sectors 58 are fed, via matching transformers 62, to receivers 64. The receivers 64 amplify and detect the beam signals (usually the received pulse in each beam with the greatest amplitude) and pass them on to the scanning commutator 66. The scanning commutator 66 periodically and rapidly samples in sequence the output of each receiver.

Whenever a signal has been detected in any one receiver the scanning commutator 66 transmits an impulse to video amplifier 68. Impulses from the video amplifier go to the grid of the cathode ray display tube, whose deflection system is in synchronism with the scanning commutator 66 to form the display analog 4'.

*Corrections*

In addition to corrections for pitch and roll as already described corrections may be made in any appropriate manner to compensate for such aberrational movements of the ship 2 as changes in speed, yaw, drift, heading and course changes, rapid lateral displacements, and incorrect navigational data. A preferred manner of accomplishing some of these corrections, particularly when strip mapping and/or direct contour map generation is involved, are disclosed in the aforementioned copending patent application, Ser. No. 165,064, of Lustig and Rossoff. Compensation for changes in the depth of the arrays 10 and 18 (such as accompany pitching of the ship 2, changes in its depth if it is a submarine, or changes in its altitude if it is an aircraft), and for variations in sound velocity in accordance with the depth of the water through which it passes can also be made.

*Conclusion*

The system of the present invention can be used for continuous, effective and accurate mapping of terrain from a mapping station moving over that terrain at an appreciable speed. The design and manner of cooperation of the various parts greatly facilitates their construction and use, minimizes the power requirements of the system, simplifies some of the corrections which should be applied for the attainment of a proper degree of accuracy, and eliminates the need for certain corrections.

The specific construction of the various elements involved, and the specific design of the several electrical circuit components, may be varied widely, and may take known forms. Accordingly they have been here disclosed schematically or in block diagram form.

Although only a single embodiment of the present invention has been here specifically disclosed, it will be apparent that many variations may be made therein, all within the scope of the invention as defined in the following claims.

We claim:

1. A system for mapping an area from a mapping station moving over said area which comprises means for transmitting a beam of energy from said station, said beam being wide in a first direction and narrow in a second direction at right angles to said first direction, means for receiving transmitted radiation reflected from said area in a plurality of adjacent individual receiving beams, said receiving beams being wide in said second direction, narrow in said first direction and arranged relative to one another in said second direction, and means for recording signals received in each receiving beam, said receiving means comprising an array of a plurality of individual transducing elements of greater number than the number of said beams, more than one of said elements being operatively associated with one another to produce reception in a given beam.

2. The system of claim 1, in which said receiving means comprises a plurality of individual receiving elements located in a non-planar array, and means operatively connected between said receiving elements and said recording means for compensating for the departure in positions of said receiving elements from a planar array.

3. The system of claim 1, in which said receiving means comprises a plurality of individual receiving elements located in a non-planar array, and means operatively connected between said receiving elements and said recording means for compensating for the departure in positions of said receiving elements from a planar array by varying the phase relationship between the signals produced by said receiving elements.

4. The system of claim 1, in which said receiving means comprises a plurality of individual receiving elements located in a non-planar array, and means operatively connected between said receiving elements and said recording means for compensating for the departure in positions of said receiving elements from a planar array by varying the phase relationship between the signals produced by said receiving elements in accordance with the formula $\theta_i = 360_n - \phi_i$, where $\phi_i = d_i f/c$, $d_i$ is the distance of a given element $i$ above the lowermost element, $f$ is the frequency of said radiations, $c$ is the speed of movement of said radiations through the medium through which they pass, $\theta_i$ represents the desired phase shift, and $n$ is an integer.

5. The system of claim 1, in which a single recording means is operatively connected to all of said beams.

6. The system of claim 5, in which said plurality of receiving means beams collectively cover a first length of said area to be mapped measured in said first direction, and means for selecting for recording purposes a smaller plurality of said beams covering a second length of said area to be mapped included within and less than said first length.

7. The system of claim 1, in which said plurality of receiving means beams collectively cover a first length of said area to be mapped measured in said first direction, and means for selecting for recording purposes a smaller plurality of said beams covering a second length of said area to be mapped included within and less than said first length.

8. A system for mapping an area from a mapping station moving over said area which comprises means for transmitting a beam of energy from said station, said beam being wide in a first direction and narrow in a second direction at right angles to said first direction, means for receiving transmitted radiation reflected from said area in a plurality of adjacent individual receiving beams, said receiving beams being wide in said second direction, narrow in said first direction and arranged relative to one another in said second direction and means for recording signals received in each receiving beam, said plurality of receiving means beams collectively covering a first length of said area to be mapped measured in said first direction, and means for selecting for recording purposes a smaller plurality of said beams covering a second length of said area to be mapped included within and less than said first length.

9. A system for mapping an area from a mapping station moving over said area which comprises means for transmitting a beam of energy from said station, said beam being wide in a first direction and narrow in a second direction at right angles to said first direction, means for receiving transmitted radiation reflected from said area simultaneously in a plurality of adjacent individual receiving beams, said receiving beams being wide in said second direction, narrow in said first direction and arranged relative to one another in said second direction, and means for recording signals received in each receiving beam, said receiving means comprising an array of a plurality of individual transducing elements of greater number than the number of said beams, more than one of said elements being operatively associated with one another to produce reception in a given beam.

10. The system of claim 9, in which a single recording means is operatively connected to all of said beams.

11. The system of claim 10, in which said plurality of receiving means beams collectively cover a first length of said area to be mapped measured in said first direction, and means for selecting for recording purposes a smaller plurality of said beams covering a second length of said area to be mapped included within and less than said first length.

12. The system of claim 9, in which said plurality of receiving means beams collectively cover a first length of said area to be mapped measured in said first direction, and means for selecting for recording purposes a smaller plurality of said beams covering a second length of said area to be mapped included within and less than said first length.

13. A system for mapping an area from a mapping station moving over said area which comprises means for transmitting a beam of energy from said station, said beam being wide in a first direction and narrow in a second direction at right angles to said first direction, means for receiving transmitted radiation reflected from said area in a plurality of substantially adjacent individual receiving beams, said receiving beams being wide in said second direction, narrow in said first direction and arranged relative to one another in said second direction, and means for recording signals received from a selected one of said receiving beams, said receiving means comprising an array of a plurality of individual transducing elements of greater number than the number of said beams, more than one of said elements being operatively associated with one another to produce reception in a given beam.

14. The system of claim 13, in which a single recording means is operatively connected to all of said beams.

15. The system of claim 13, in which said receiving means comprises a plurality of individual receiving elements located in a non-planar array, and means operatively connected between said receiving elements and said recording means for compensating for the departure in positions of said receiving elements from a planar array.

16. The system of claim 13, in which said receiving means comprises a plurality of individual receiving elements located in a non-planar array, and means operatively connected between said receiving elements and said recording means for compensating for the departure in positions of said receiving elements from a planar array by varying the phase relationship between the signals produced by said receiving elements.

17. The system of claim 13, in which said receiving means comprises a plurality of individual receiving elements located in a non-planar array, and means operatively connected between said receiving elements and said recording means for compensating for the departure in positions of said receiving elements from a planar array by varying the phase relationship between the signals produced by said receiving elements in accordance with the formula $\theta_i = 360_n - \phi_i$, where $\phi_i = d_i f/c$, $d_i$ is the distance of a given element $i$ above the lowermost element, $f$ is the frequency of said radiations, $c$ is the speed of movement of said radiations through the medium through which they pass, $\theta_i$ represents the desired phase shift, and $n$ is an integer.

18. A system for mapping an area from a mapping station moving over said area which comprises means for transmitting a beam of energy from said station, said beam being wide in a first direction and narrow in a second direction at right angles to said first direction, means for receiving transmitted radiation reflected from said area simultaneously in a plurality of substantially adjacent individual receiving beams, said receiving beams being wide in said second direction, narrow in said first direction and arranged relative to one another in said second direction, and means for recording signals received from a selected one of said receiving beams, said receiving means comprising an array of a plurality of individual transducing elements of greater number than the number of said beams, more than one of said elements being operatively associated with one another to produce reception in a given beam.

19. The system of claim 18, in which said plurality of receiving means beams collectively cover a first length of said area to be mapped measured in said first direction, and means for selecting for recording purposes a smaller plurality of said beams covering a second length of said area to be mapped included within and less than said first length.

20. The system of claim 18, in which said receiving means comprises a plurality of individual receiving elements located in a non-planar array, and means operatively connected between said receiving elements and said recording means for compensating for the departure in positions of said receiving elements from a planar array.

21. The system of claim 18, in which said receiving means comprises a plurality of individual receiving elements located in a non-planar array, and means operatively connected between said receiving elements and said recording means for compensating for the departure in positions of said receiving elements from a planar array by varying the phase relationship between the signals produced by said receiving elements.

22. The system of claim 18, in which said receiving means comprises a plurality of individual receiving elements located in a non-planar array, and means operatively connected between said receiving elements and said recording means for compensating for the departure in positions of said receiving elements from a planar array by varying the phase relationship between the signals produced by said receiving elements in accordance with the formula $\theta_i = 360_n - \phi_i$, where $\phi_i = d_i f/c$, $d_i$ is the distance of a given element $i$ above the lowermost element, $f$ is the frequency of said radiations, $c$ is the speed of movement of said radiations through the medium through which they pass, $\theta_i$ represents the desired phase shift, and $n$ is an integer.

References Cited in the file of this patent

UNITED STATES PATENTS

| | | |
|---|---|---|
| 2,544,677 | Hammond et al. | Mar. 13, 1951 |
| 2,908,888 | Kirkland | Oct. 13, 1959 |
| 2,972,732 | Hammond | Feb. 21, 1961 |
| 3,002,188 | Abbott | Sept. 26, 1961 |
| 3,039,094 | Anderson | June 12, 1962 |

FOREIGN PATENTS

| | | |
|---|---|---|
| 778,673 | Great Britain | July 10, 1957 |
| 1,038,460 | Germany | Sept. 4, 1958 |